(12) United States Patent
Shamoon

(10) Patent No.: US 7,987,514 B2
(45) Date of Patent: *Jul. 26, 2011

(54) SYSTEMS AND METHODS FOR RETROFITTING ELECTRONIC APPLIANCES TO ACCEPT DIFFERENT CONTENT FORMATS

(75) Inventor: Talal G. Shamoon, Palo Alto, CA (US)

(73) Assignee: Intertrust Technologies Corp., Sunnyvale, CA (US)

( * ) Notice: Subject to any disclaimer, the term of this patent is extended or adjusted under 35 U.S.C. 154(b) by 1144 days.

This patent is subject to a terminal disclaimer.

(21) Appl. No.: 11/717,304

(22) Filed: Mar. 12, 2007

(65) Prior Publication Data

US 2007/0230698 A1 Oct. 4, 2007

Related U.S. Application Data

(63) Continuation of application No. 11/398,325, filed on Apr. 4, 2006, now Pat. No. 7,190,792.

(51) Int. Cl.
*G06F 7/04* (2006.01)
*G06F 17/30* (2006.01)
*H04N 7/16* (2006.01)

(52) U.S. Cl. .............. 726/27; 725/25; 725/37; 380/231; 380/239

(58) Field of Classification Search .................. 380/200, 380/231, 239; 725/25, 37; 726/26, 27
See application file for complete search history.

(56) References Cited

U.S. PATENT DOCUMENTS

| 4,623,920 A | 11/1986 | Dufresne et al. |
| 4,827,508 A | 5/1989 | Shear |
| 4,977,594 A | 12/1990 | Shear |
| 4,998,278 A | 3/1991 | Sasa |
| 5,050,213 A | 9/1991 | Shear |
| 5,237,610 A | 8/1993 | Gammie et al. |
| 5,321,750 A | 6/1994 | Nadan |
| 5,410,598 A | 4/1995 | Shear |
| 5,530,235 A | 6/1996 | Stefik et al. |
| 5,534,975 A | 7/1996 | Stefik et al. |
| 5,629,980 A | 5/1997 | Stefik et al. |
| 5,634,012 A | 5/1997 | Stefik et al. |
| 5,638,443 A | 6/1997 | Stefik et al. |

(Continued)

FOREIGN PATENT DOCUMENTS

EP 0 715 247 A1 6/1996

(Continued)

OTHER PUBLICATIONS

Menezes, A. J. et al., *Handbook of Applied Cryptography*, CRC Press, Oct. 1996. ISBN 0-8493-8523-7 (hardcover).

(Continued)

*Primary Examiner* — David García Cervetti
(74) *Attorney, Agent, or Firm* — Finnegan, Henderson, Farabow, Garrett & Dunner LLP

(57) ABSTRACT

Systems and methods are disclosed for using an arbitrary fixed channel to carry third-party information. In one embodiment, the present invention provides systems and methods for enabling existing content rendering devices to accept content encoded in a proprietary format, such as an encoding format used by a digital rights management system. The encoded content is rendered by the device in the normal manner, and decoded by a retrofitting appliance connected to the device's output. The retrofitting appliance may apply decoded rules and controls to the decoded content, thereby managing use of the content.

16 Claims, 7 Drawing Sheets

U.S. PATENT DOCUMENTS

| | | | |
|---|---|---|---|
| 5,715,403 | A | 2/1998 | Stefik |
| 5,825,879 | A | 10/1998 | Davis |
| 5,872,784 | A | 2/1999 | Rostoker et al. |
| 5,892,900 | A | 4/1999 | Ginter et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,920,861 | A | 7/1999 | Hall et al. |
| 5,933,500 | A | 8/1999 | Blatter et al. |
| 5,940,504 | A | 8/1999 | Griswold |
| 5,943,422 | A | 8/1999 | Van Wie et al. |
| 5,949,876 | A | 9/1999 | Ginter et al. |
| 5,982,891 | A | 11/1999 | Ginter et al. |
| 5,999,949 | A | 12/1999 | Crandall |
| 6,035,037 | A | 3/2000 | Chaney |
| 6,081,290 | A | 6/2000 | Schmidt et al. |
| 6,112,181 | A | 8/2000 | Shear et al. |
| 6,138,119 | A | 10/2000 | Hall et al. |
| 6,157,721 | A | 12/2000 | Shear et al. |
| 6,185,683 | B1 | 2/2001 | Ginter et al. |
| 6,237,786 | B1 | 5/2001 | Ginter et al. |
| 6,240,185 | B1 | 5/2001 | Van Wie et al. |
| 6,253,193 | B1 | 6/2001 | Ginter et al. |
| 6,292,569 | B1 | 9/2001 | Shear et al. |
| 6,363,488 | B1 | 3/2002 | Ginter et al. |
| 6,389,402 | B1 | 5/2002 | Ginter et al. |
| 6,427,140 | B1 | 7/2002 | Ginter et al. |
| 6,449,367 | B2 | 9/2002 | Van Wie et al. |
| 6,618,484 | B1 | 9/2003 | Van Wie et al. |
| 6,640,304 | B2 | 10/2003 | Ginter et al. |
| 6,658,568 | B1 | 12/2003 | Ginter et al. |
| 6,668,325 | B1 | 12/2003 | Collberg et al. |
| 6,751,321 | B1 | 6/2004 | Kato et al. |
| 6,771,657 | B1 | 8/2004 | Elstermann |
| 6,785,815 | B1 | 8/2004 | Serret-Avila et al. |
| 6,832,316 | B1 | 12/2004 | Sibert |
| 7,050,586 | B1 | 5/2006 | Shamoon |
| 7,143,066 | B2 * | 11/2006 | Shear et al. ............... 705/54 |
| 2001/0042043 | A1 * | 11/2001 | Shear et al. ............... 705/51 |
| 2002/0023214 | A1 | 2/2002 | Shear et al. |
| 2002/0048369 | A1 | 4/2002 | Ginter et al. |
| 2002/0087859 | A1 | 7/2002 | Weeks et al. |
| 2002/0112171 | A1 | 8/2002 | Ginter et al. |
| 2002/0152173 | A1 | 10/2002 | Rudd |
| 2003/0023856 | A1 | 1/2003 | Horne et al. |
| 2003/0041239 | A1 | 2/2003 | Shear et al. |
| 2003/0046244 | A1 | 3/2003 | Shear et al. |
| 2003/0069748 | A1 | 4/2003 | Shear et al. |
| 2003/0069749 | A1 | 4/2003 | Shear et al. |
| 2003/0084003 | A1 | 5/2003 | Pinkas et al. |
| 2003/0105721 | A1 | 6/2003 | Ginter et al. |
| 2003/0163431 | A1 | 8/2003 | Ginter et al. |
| 2004/0054630 | A1 | 3/2004 | Ginter et al. |
| 2004/0059951 | A1 | 3/2004 | Pinkas et al. |
| 2004/0073813 | A1 | 4/2004 | Pinkas et al. |
| 2004/0103305 | A1 | 5/2004 | Ginter et al. |
| 2004/0107356 | A1 | 6/2004 | Shamoon et al. |
| 2004/0123129 | A1 | 6/2004 | Ginter et al. |
| 2004/0133793 | A1 | 7/2004 | Ginter et al. |
| 2005/0027871 | A1 | 2/2005 | Bradley et al. |
| 2005/0050332 | A1 | 3/2005 | Serret-Avila et al. |
| 2005/0060560 | A1 | 3/2005 | Sibert |
| 2005/0060584 | A1 | 3/2005 | Ginter et al. |
| 2005/0091487 | A1 * | 4/2005 | Cross et al. ............... 713/165 |
| 2005/0108555 | A1 | 5/2005 | Sibert |
| 2005/0138400 | A1 * | 6/2005 | Wu et al. ............... 713/189 |
| 2006/0059573 | A1 * | 3/2006 | Jung et al. ............... 726/31 |
| 2006/0212370 | A1 * | 9/2006 | Shear et al. ............... 705/28 |
| 2007/0223697 | A1 * | 9/2007 | Mizuno ............... 380/245 |

FOREIGN PATENT DOCUMENTS

| | | |
|---|---|---|
| WO | WO 96/27155 | 9/1996 |
| WO | WO 97/43761 | 11/1997 |
| WO | WO 98/09209 | 3/1998 |
| WO | WO 98/10381 | 3/1998 |
| WO | WO 98/37481 | 8/1998 |
| WO | WO 99/01815 | 1/1999 |
| WO | WO 99/24928 | 5/1999 |
| WO | WO 99/48296 | 9/1999 |
| WO | WO 00/75925 | 12/2000 |
| WO | WO 01/06374 | 1/2001 |
| WO | WO 01/09702 | 2/2001 |
| WO | WO 01/10076 | 2/2001 |

OTHER PUBLICATIONS

Sibert, Olin, et al., "DigiBox: A Self-Protecting Container for Information Commerce," Proceedings of the First USENIX Workshop on Electronic Commerce, New York, NY, Jul. 1995, 9 pages.

Sibert, Olin, et al., "Securing the Content, Not the Wire, for Information Commerce," InterTrust Technologies Corporation, 1996, 12 pages.

Stefik, M., "Trusted Systems," Scientific American, Mar. 1997, pp. 1-7.

Stefik, M., "Letting Loose the Light: Igniting Commerce in Electronic Publication," Xerox PARC, Palo Alto, CA, 1994-1995, pp. 1-35.

Stefik, M., "Letting Loose the Light: Igniting Commerce in Electronic Publication," Internet Dreams: Archetypes, Myths, and Metaphors, Massachusetts Institute of Technology, 1996, pp. 219-253.

Stefik, M., "Chapter 7, Classification, Introduction to Knowledge Systems," Morgan Kaufmann Publishers, Inc., 1995, pp. 543-607.

Office Action mailed Sep. 23, 2004 for U.S. Appl. No. 09/885,415, filed Jun. 19, 2001.

Final Office Action mailed Jun. 10, 2005 for U.S. Appl. No. 09/885,415, filed Jun. 19, 2001.

Notice of Allowance mailed Feb. 21, 2006 for U.S. Appl. No. 09/885,415, filed Jun. 19, 2001.

Supplemental Notice of Allowance mailed Feb. 21, 2006 for U.S. Appl. No. 09/885,415, filed Jun. 19, 2001.

Supplemental Notice of Allowance mailed Mar. 22, 2006 for U.S. Appl. No. 09/885,415, filed Jun. 19, 2001.

Office Action mailed Aug. 16, 2006 for U.S. Appl. No. 11/398,325, filed Apr. 4, 2006.

Notice of Allowance mailed Nov. 28, 2006 for U.S. Appl. No. 11/398,325, filed Apr. 4, 2006.

* cited by examiner

SYSTEMS AND METHODS FOR RETROFITTING ELECTRONIC APPLIANCES TO ACCEPT DIFFERENT CONTENT FORMATS

RELATED APPLICATIONS

This application is a continuation of application Ser. No. 11/398,325, filed Apr. 4, 2006 now U.S. Pat. No. 7,190,792, which claims the benefit of application Ser. No. 09/885,415, filed Jun. 19, 2001 (now U.S. Pat. No. 7,050,586), which further claims the benefit of U.S. Provisional Application No. 60/212,642, filed Jun. 19, 2000, titled "Systems and Methods for Retrofitting Electronic Appliances to Accept Different Content Formats," all of which are incorporated herein by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the management and use of electronic content. More specifically, systems and methods are disclosed for retrofitting or adapting electronic appliances to accept content formats different from those the appliance was originally designed to accept.

BACKGROUND OF THE INVENTION

The rapid growth of the market for digital goods has created a need for systems and methods to protect and enforce the rights and interests of content owners. While increasing attention has been paid to the development of digital rights management (DRM) mechanisms to address this need, the large number of competing—and typically incompatible—rights management systems has created problems of its own, as existing content rendering devices are often incapable of rendering content encoded in accordance with the formats of the many DRM systems.

SUMMARY OF THE INVENTION

Systems and methods are disclosed for using an arbitrary fixed channel to carry third-party information. In one embodiment, the present invention provides systems and methods for enabling existing content rendering devices to accept content encoded in a proprietary format, such as an encoding format used by a digital rights management system. It should be appreciated that the present invention can be implemented in numerous ways, including as a process, an apparatus, a system, a device, a method, a computer readable medium, or as a combination thereof. Several inventive embodiments of the present invention are described below.

In one embodiment, a system for managing the use of electronic content is described. The system includes an electronic appliance for receiving encoded content and encoded control information and for rendering the encoded content and the encoded control information through an output. A retrofitting appliance is connected to the output, and is used to decode the encoded content and encoded control information to recover copies of the original content and control information. The recovered control information is then used to govern the use of the recovered content. The retrofitting appliance uses the control information to determine whether use of the content is allowed, and if it is, the retrofitting appliance sends the content to an output device for presentation to a user.

In another embodiment, a method of managing electronic content is provided. Encoded electronic content and encoded control information are received at a first electronic appliance. The encoded electronic content and encoded control information form part of a data signal encoded in a rendering format supported by the first electronic appliance. The encoded electronic content and encoded control information are rendered through the output of the first electronic appliance, and the rendered content and control information are received at a second electronic appliance. The second appliance decodes the rendered electronic content and control information to recover decoded electronic content and decoded control information. The second electronic appliance then uses the decoded control information to determine whether to permit the decoded electronic content to be used in a certain manner. If the second electronic appliance determines that the decoded electronic content can be used, then the second electronic appliance transmits the decoded electronic content to an output device.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of the invention is provided below. While the invention is described in conjunction with several embodiments, it should be understood that the invention is not limited to any one embodiment. On the contrary, the scope of the invention is limited only by the appended claims and encompasses numerous alternatives, modifications, and equivalents. In addition, while numerous specific details are set forth in the following description in order to provide a thorough understanding of the present invention, the present invention may be practiced according to the claims without some or all of these details. Finally, for the purpose of clarity, certain technical material that is known in the art has not been described in detail in order to avoid obscuring the present invention.

The present invention provides systems and methods for enabling an existing appliance format to carry third-party information. For example, the systems and methods of the present invention can be used to enable an audio or video compact disc (CD) player to play discs containing content encoded in a proprietary format, such as content stored in DigBox® or DigiFile™ containers produced by InterTrust Technologies Corporation of 4750 Patrick Henry Drive, Santa Clara, Calif., content encoded in another commercial DRM format, and/or content encoded in virtually any other format. It should be understood that the present invention is not limited to use in connection with CD players, but may also be applied to any other suitable content rendering appliance, including without limitation DVD players and set-top boxes, to name just a few additional examples. Furthermore, the systems and methods of the present invention may be applied to devices with both analog and digital outputs. As used herein, an existing appliance will occasionally be referred to as "the fixed content delivery channel."

Figure 1:
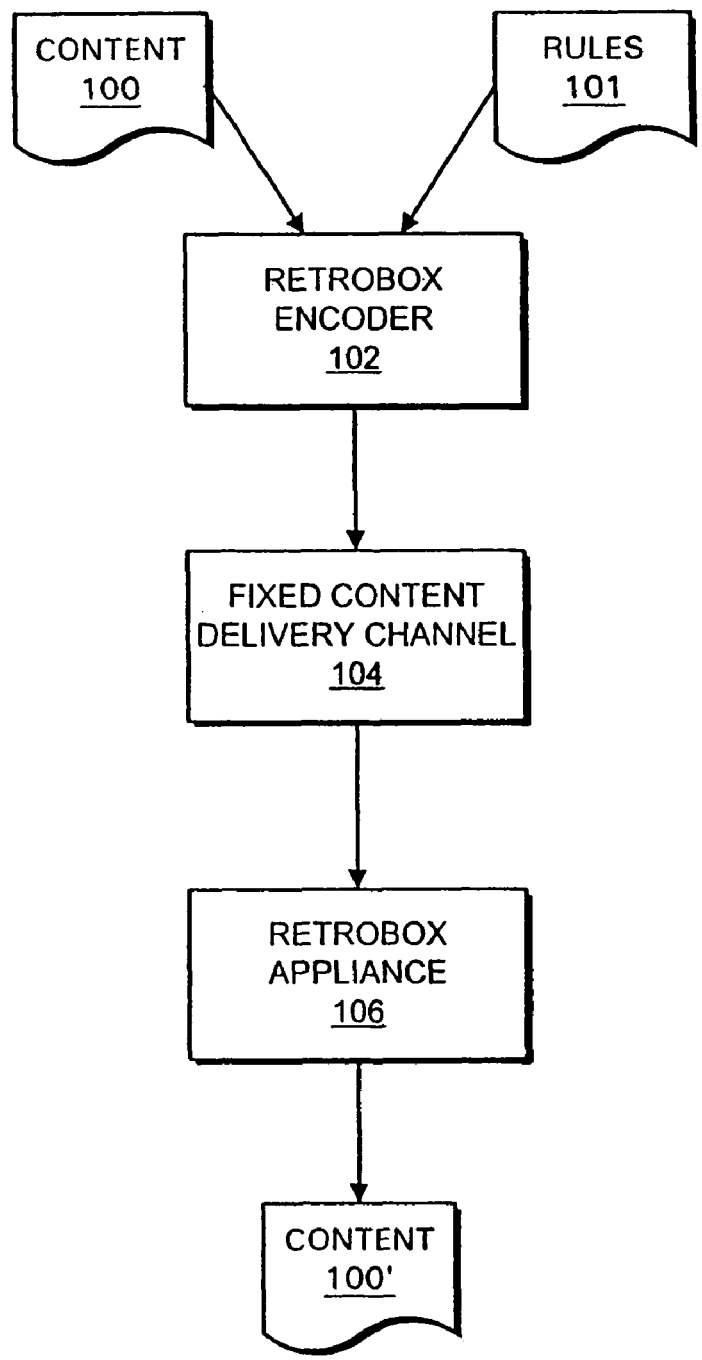
FIG. 1 illustrates a system for practicing embodiments of the present invention.

FIG. 1 illustrates a system for practicing embodiments of the present invention. Various components of the system shown in FIG. 1 will be referred to as "RetroBox" components, since the components are operable to retrofit or otherwise adapt an existing electronic appliance to carry content encoded in a new format (e.g., a format that the electronic appliance was not originally designed to decode). As shown in FIG. 1, in one embodiment a generalized RetroBox system includes a RetroBox encoder 102 and a RetroBox appliance 106. RetroBox encoder 102 is used by content creators to package content 100 and rules 101 governing the content's use in a format that fixed content delivery channel (e.g., player) 104 can handle. RetroBox appliance 106 connects to the output of the existing format player 104, and preferably includes a decoder module and a core module. RetroBox appliance 106 decodes the output of existing format player 104 to recover content 100' and rules 101' (or content and rules substantially similar to content 100 and rules 101, although slightly different due to e.g., signal degradation). The Retrobox appliance 106 can then interpret the rules, and govern the use of content 100' in accordance therewith.

Although the embodiment illustrated in FIG. 1 shows rules 101 being packaged with content 100, in some embodiments rules can also (or alternatively) be delivered to Retrobox appliance 106 independently of the content to which they relate. For example, rules could be packaged separately and delivered to the Retrobox appliance via the fixed content delivery channel 104, and/or could be sent directly to the Retrobox appliance via an external connection between Retrobox appliance and, e.g., an Internet website or other remote server. Once received by the Retrobox appliance, rules can be used to govern the use of previously received content, and/or subsequently received content. Additional information on the use of rules and controls to govern the distribution and use of electronic content can be found in commonly-assigned U.S. Pat. No. 5,892,900, entitled "Systems and Methods for Secure Transaction Management and Electronic Rights Protection," issued Apr. 6, 1999 ("the '900 patent"), which is hereby incorporated by reference in its entirety. The terms "rules", "controls", and "control information" are used interchangeably in the following discussion.

As shown in FIG. 1, content 100 and rules 101 arrive at encoder 102. Encoder 102 packages them and puts them into a format that fixed content channel 104 can interpret. The RetroBox appliance's decoder retrieves the encoded content and rules from the output of the delivery channel, and performs the necessary information recovery steps required to extract the content and rules.

Figure 1A:
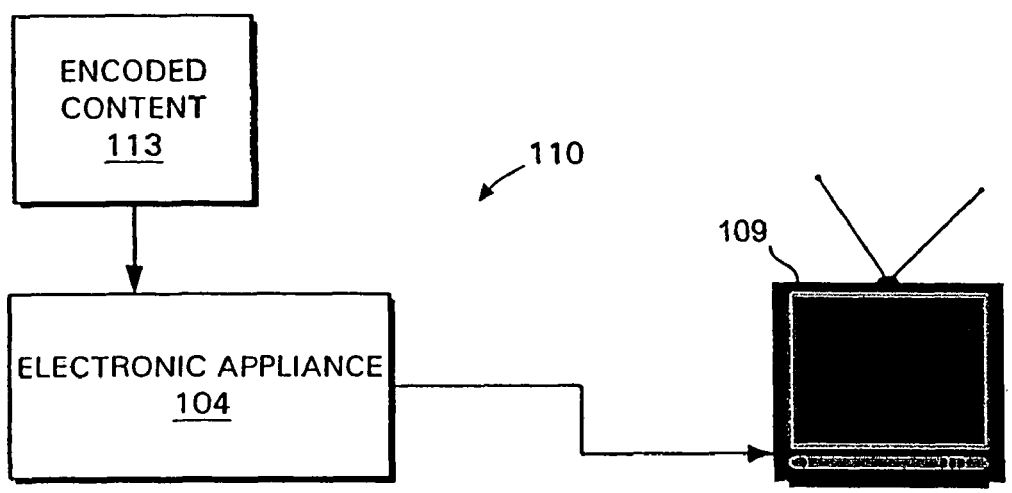
FIG. 1A illustrates how a conventional system can be adapted to handle content encoded in a proprietary encoding format.
Figure 1A:
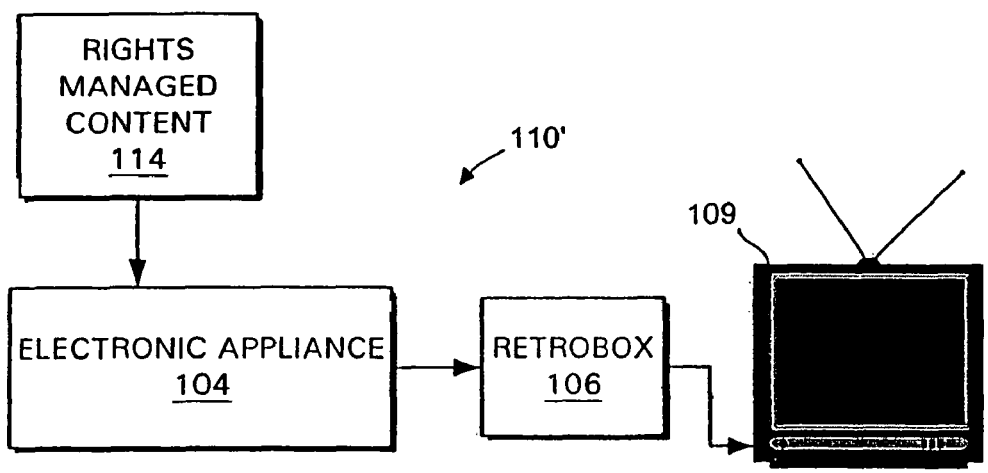

FIG. 1A illustrates how an existing system 110 can be adapted to handle content encoded in a proprietary format using the techniques described above. Referring to FIG. 1A, system 110 includes an electronic appliance 104 connected to an output device 109. In the example shown in FIG. 4, electronic appliance might comprise a television set-top box, a digital versatile disk (DVD) player, a videocassette player, or the like, and output device 109 comprises a television set or other video display monitor. It will be appreciated, however, that the concepts described in connection with FIG. 1A are readily applicable to a wide variety of other electronic appliances and output devices (e.g., CD players and speakers).

Electronic appliances 104 are typically designed to accept a certain type (or types) of encoded electronic content 113 (e.g., a DVD, CD, videocassette, satellite signal, cable signal, or the like). Electronic appliance 104 decodes or transforms content 113 into a form that the output device can handle, and sends it to the output device for presentation to a system user. As shown in FIG. 1A, the present invention provides a way to adapt system 110 to handle content 114 that is encoded in a proprietary format, such as a proprietary digital rights management format. In particular, in system 110' electronic appliance 104 is retrofitted with Retrobox application 106. Retrobox application 106 connects to the output of electronic appliance 104, and is operable to intercept signals from electronic appliance 104 to output device 109. Retrobox 106 processes these signals and produces new or modified signals which it sends to output device 109 for presentation to a system user.

Figure 2:
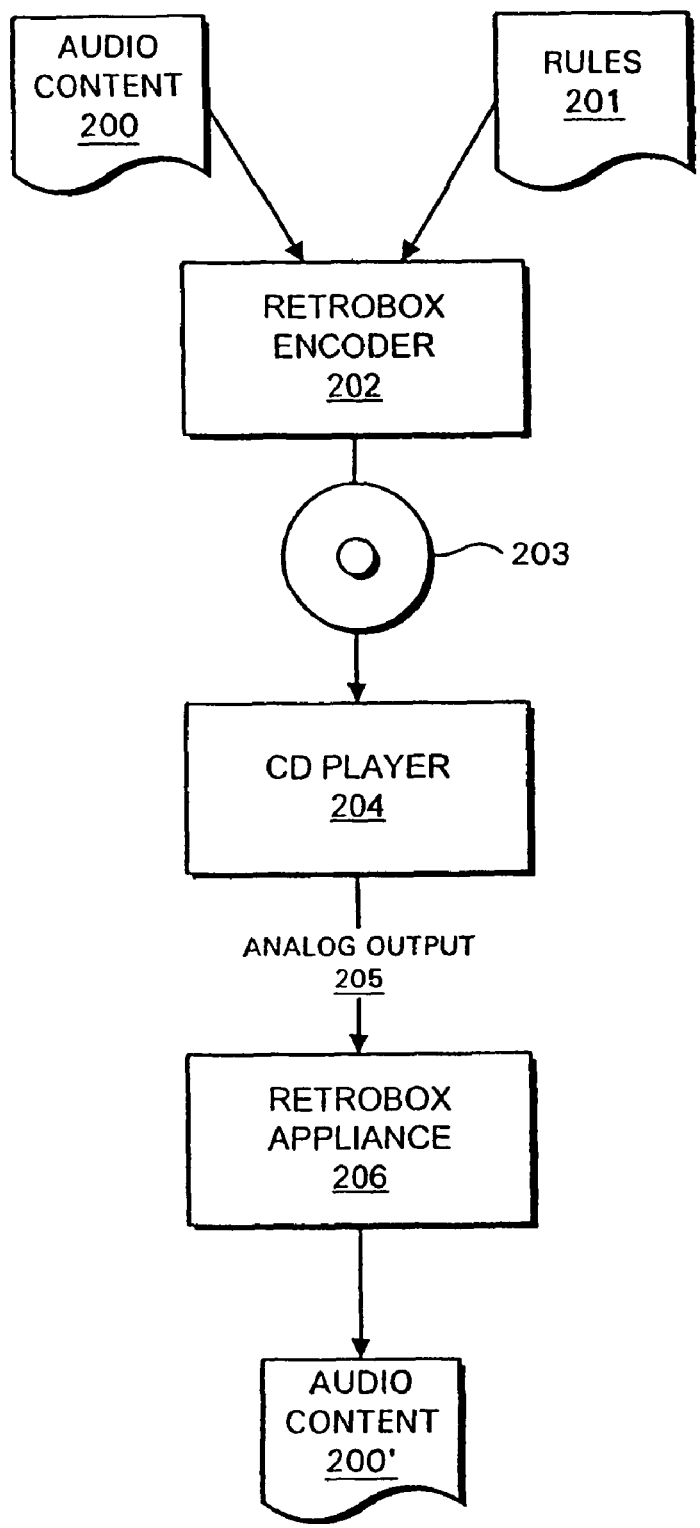
FIG. 2 illustrates the use of an embodiment of the present invention in connection with Red Book CD audio content.

FIG. 2 illustrates the use of the RetroBox system in connection with Red Book CD audio content. As shown in FIG. 2, encoder 202 outputs data that is in Red Book CD audio format 203. For example, data 203 may be stored on a CD. CD player 204 plays the CD as it would any other audio CD, but if one were to listen to the output 205 of the player, it would sound like noise.

However, RetroBox appliance 206 picks up the analog signal 205 emanating from the line-out port of CD player 204. RetroBox appliance 206 performs analog-to-digital (A/D) conversion and resampling to obtain a digital signal, and proceeds to demodulate and decode the resulting digital signal in a sequence of steps that will be described in more detail below. At the end of this process, the content (or a substantially similar version of the content) 200' and rules 201 that entered the encoder 202 will reappear.

It will be appreciated that if the CD player in question has a digital output port, then the A/D and resampling steps could be dispensed with, and the digital stream could be decoded accordingly. Alternatively, or in addition, Retrobox appliance 206 could be designed to process the analog output directly. For example, Retrobox appliance could be designed to perform what would effectively be an analog-to-analog conversion by extracting rules directly from the analog output and descrambling the analog content in accordance therewith to recover the original audio content 200'.

A key idea is to treat the fixed content delivery channel (FCDC) as a communications channel under the classical Shannon communications model. Essentially, the channel transports the information yet introduces distorting noise. As with any communications channel, this one has a capacity. Capacity is a function of the distorting noise and gates the maximum amount of information (bits/second) that may flow through it. This capacity may be achieved through a variety of techniques such as error-control and modulation coding combined with data compression and encryption (for security.)

In the aforementioned example of an audio CD player, the process of red book decoding is information lossless, yet the process of D/A conversion is not. This is the principal source of distortion. In the case of video CD (MPEG-1 based) or any lossy coder (MPEG-2 based), additional noise will typically be introduced by the decompression process. A way to guard against this is to apply more aggressive error control codes to the content. Ultimately,.the greater the noise on the channel, the less the capacity will be. However, compressing the data in advance will boost the amount of information each symbol going through the channel is carrying. Another technique would be to maintain the content in analog form, and to transmit control (and rules) information through the RetroBox channel.

Figure 3:
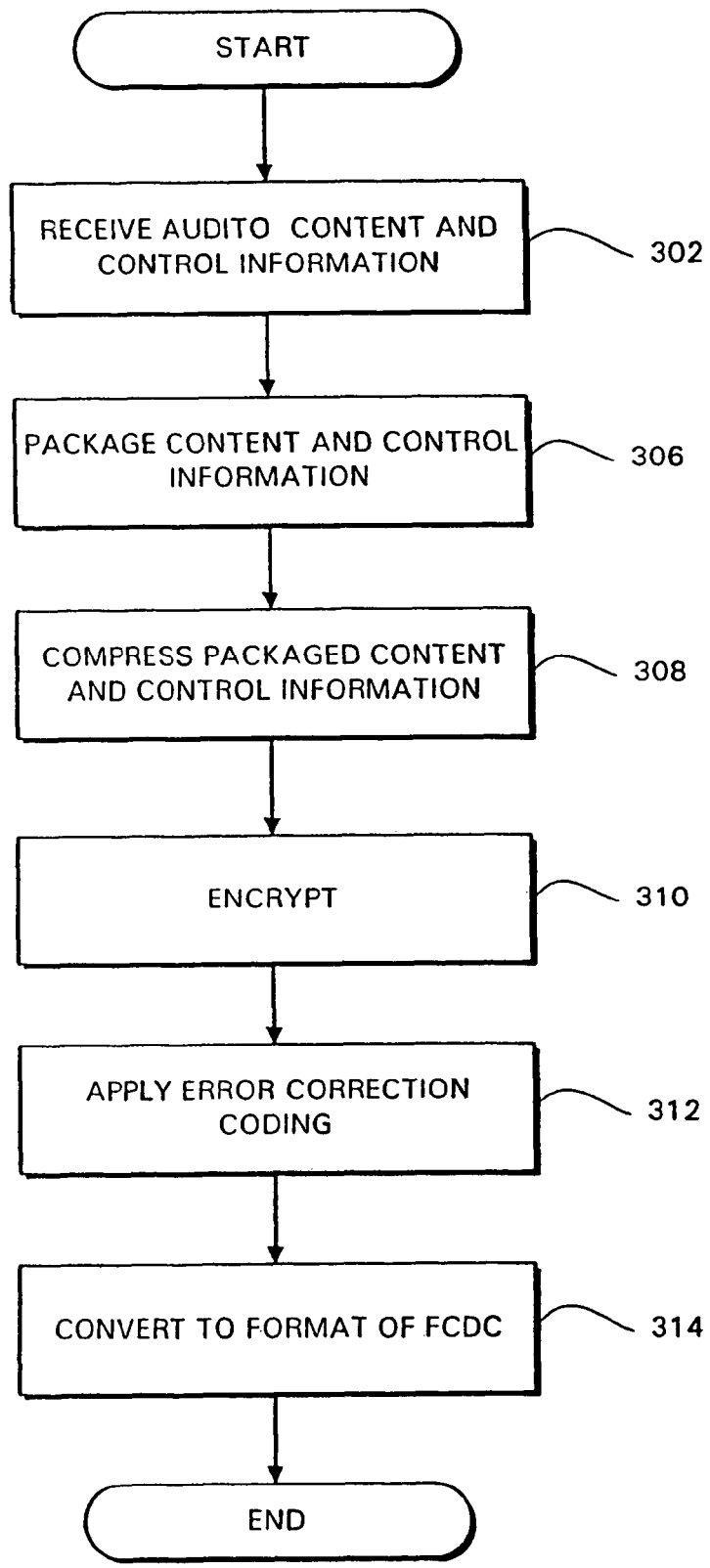
FIG. 3 is a more detailed illustration of the operation of a RetroBox encoder in one embodiment of the present invention.

FIG. 3 is a more detailed illustration of the operation of the RetroBox encoder in one embodiment of the present invention. The encoder takes rules and content and packages them (302, 306). In some embodiments, the rules and content may be compressed (308) to minimize the data's footprint. In some embodiments, the data may also be encrypted (310). Error control coding can be applied (312) to protect the content from channel distortion. The data are then formatted (314) to pass through the channel. In the case of CD audio, for example, this might mean that the data is encoded into Red Book CD format. In the case of an analog cable set top box, the formatting process would typically entail digital-to-analog conversion and modulation onto the channel carrier. In short, the formatting process makes use of standard encoding techniques to transform data into the format of the content delivery channel.

As indicated above, in some embodiments it may be desirable to apply encryption, compression, and/or error correction transformations to the signal before it is converted into the format of the content delivery channel. It will be appreciated that any suitable encryption, compression, and/or error correction algorithms could be used for purposes of practicing the present invention, and, in some embodiments, no encryption, compression, and/or error correction need be used. Examples of well-known error-correction techniques include without limitation such techniques as repetition, Hamming or other linear block codes, cyclic codes, quadratic residue codes, Golay codes, Reed-Mueller codes, Reed-Solomon codes, convolutional codes, trellis codes, and the like. A basic idea of such techniques is that by including redundancy in a communication stream, the corruption or loss of some of the information in the stream can be corrected or detected. Examples of well-known encryption/decryption algorithms are described in Menezes et al., *Handbook of Applied Cryptography* at pages 145, and 133-312 (CRC Press 1996), which is hereby incorporated by reference.

Figure 4:
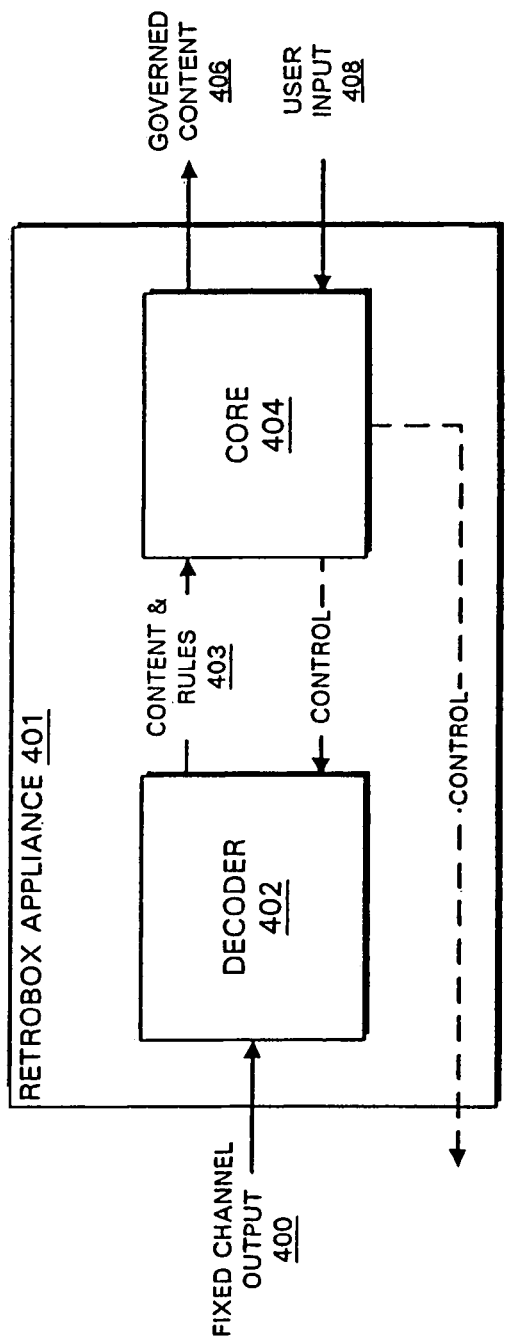
FIG. 4 shows an implementation of a RetroBox appliance in accordance with an embodiment of the present invention.

FIG. 4 shows an implementation of the RetroBox appliance in accordance with an embodiment of the present invention. As shown in FIG. 4, RetroBox appliance 401 preferably includes a decoder 402 and an appliance core 404. As discussed above, decoder 402 extracts content and rules 403 from the FCDC output stream 400. Appliance core 404 performs interpretation and application of rules to content, and transacts with the user. For example, in one embodiment appliance core 404 comprises an instance of the InterRights Point™ software or Rights/System™ software produced by InterTrust, or an implementation of the Rights Operating System software/hardware described in the '900 patent. One of ordinary skill in the art will recognize, however, that other software or hardware could be used instead, depending on the rights management system that is used to encode the content and rules. Note that appliance core 404 may have to re-encode the content into a format that can be displayed by the consumer's output device. This can be done using standard techniques, such as those used by the content delivery channel itself.

The dashed lines in the FIG. 4 illustrate (optional) lines of control. These may not be present in all devices due to constraints on the FCDC. For instance, a common audio or video CD player typically cannot be controlled from the outside (except for physically pushing buttons on the front panel). This may limit the number of business models that can be implemented on these platforms.

Figure 5:
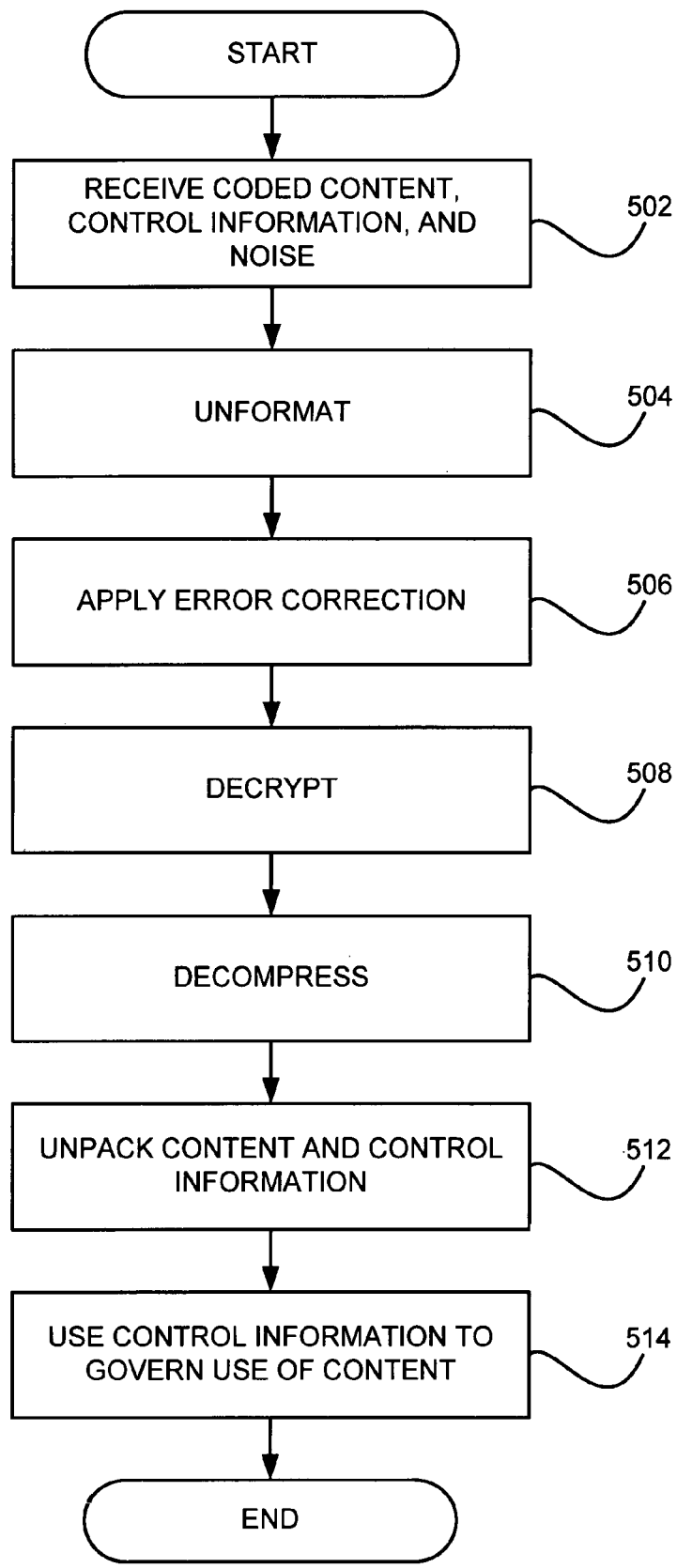
FIG. 5 illustrates the operation of a RetroBox decoder in one embodiment of the present invention.

FIG. 5 illustrates the operation of the RetroBox decoder in one embodiment of the present invention. In unformat step 504, encoded content 502 is translated from the FCDC output format into one that the decoder can interpret. In the case where the FCDC output format is analog, this step involves sampling and A/D conversion. Techniques for performing sampling and A/D conversion are well-known in the art, and any suitable technique can be used. Step 506 involves applying error-correction decoding to return the data to its input state, preferably verbatim, and will be performed if error correction was applied by the Retrobox encoder to the original signal (as shown in FIG. 3). The information may (if applicable) be subsequently decrypted (508) and decompressed (510) prior to the unpacking (512) of rules and content. The rules are then used to govern the use of the content by the software and/or hardware in the appliance core, as described, for example, in the '900 patent. If the appliance core determines that permission has been granted to use the content, the content can be transmitted to an output device for presentation to a user.

Figure 6:
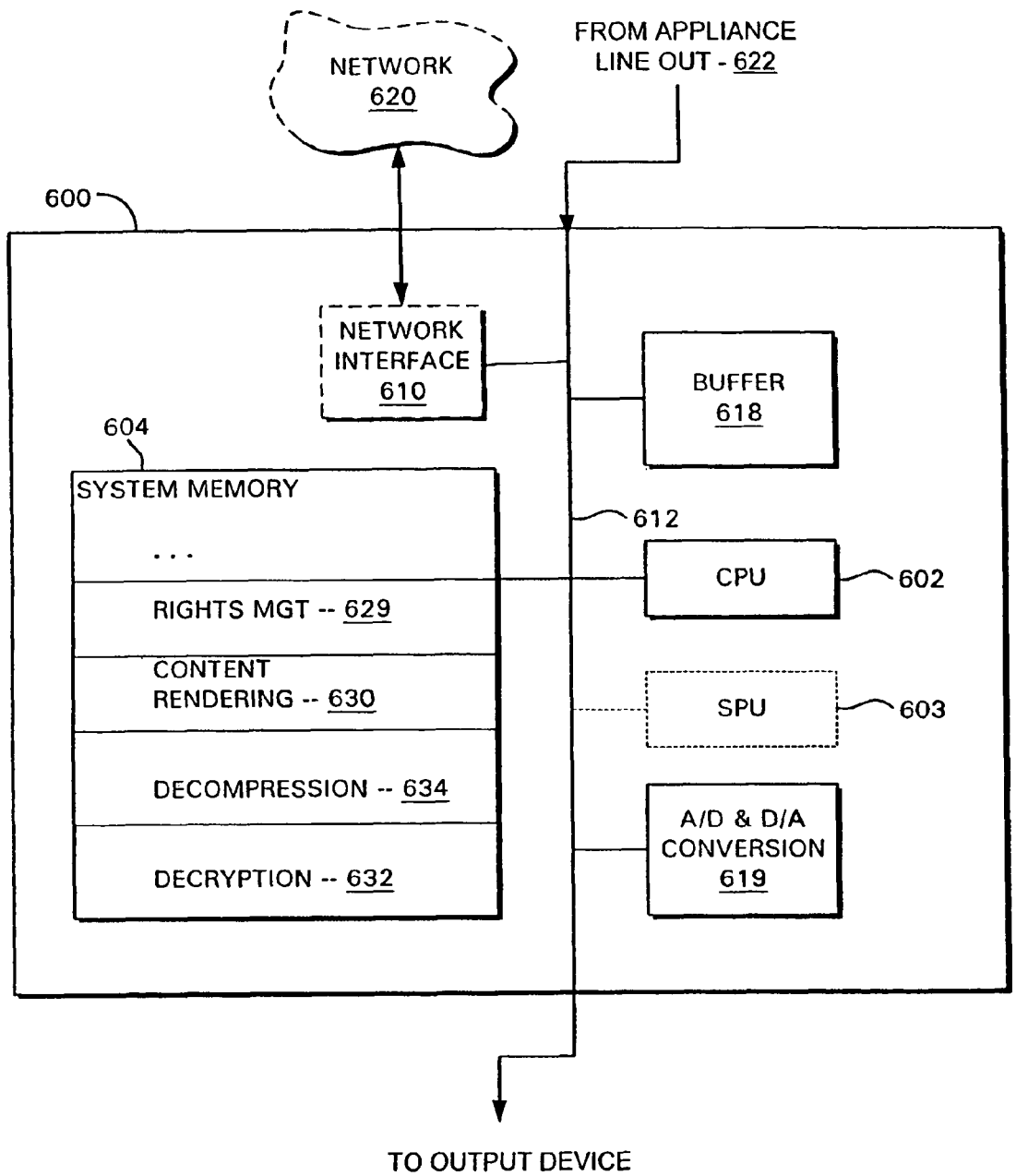
FIG. 6 provides a more detailed illustration of an implementation of a Retrobox appliance in accordance with an embodiment of the present invention.

FIG. 6 provides a more detailed illustration of a Retrobox appliance 600 in accordance with an embodiment of the present invention. Retrobox appliance 600 may comprise a general-purpose electronic appliance such as a personal computer, or a specialized electronic device such as a self-contained portable unit (or card) that can be attached to (or integrated with) the fixed content delivery channel (e.g., by plugging it into the FCDC's line-out port). Retrobox appliance 600 will typically include a processor 602, memory 604, a buffer 618 for storing incoming content from the FCDC, an analog-to-digital and digital-to-analog signal processor 619, and a bus 612 for connecting the aforementioned elements. As shown in FIG. 6, in some embodiments Retrobox appliance 600 may also include an optional network interface 610 for sending and receiving rules, permissions, content, audit information, and/or the like over a network 620 such as the Internet. In some embodiments, Retrobox appliance 600 also (or alternatively) includes a secure processing unit 603 such as that described in the '900 patent. A secure processing unit 603 can help enhance the security of sensitive operations such as key management, signature verification, and other aspects of the rights management process.

The operation of Retrobox appliance 600 will typically be controlled by processor 602 (and/or SPU 603) operating under the guidance of programs stored in memory 604. Memory 604 will generally include both high-speed random-access memory (RAM) and non-volatile memory such as a magnetic disk and/or flash EEPROM. As shown in FIG. 6, memory 604 may include a variety of programs or modules for controlling the operation of Retrobox appliance 600. For example, memory 604 will typically include one or more content rendering applications 630 for presenting electronic content to an output device of the fixed content delivery channel (e.g., a television set, monitor, speakers, etc.). Rendering applications 630 may, for example, work in connection with digital-to-analog converter 619 to convert digital content to analog form. Memory also includes a rights management program 629 such as that described in the '900 patent for applying policies, rules, and/or controls to govern the use of content or the performance of events.

One of ordinary skill in the art will appreciate that the systems and methods of the present invention can be practiced with electronic appliances that are similar or identical to that illustrated in FIG. 6, or with electronic appliances that do not possess some of the components shown in FIG. 6 and/or that possess other components that are not shown. Thus it should be appreciated that FIG. 6 is provided for purposes of illustration and not limitation as to the scope of the invention.

Although the foregoing invention has been described in some detail for purposes of clarity, it will be apparent that certain changes and modifications may be practiced within the scope of the appended claims. For example, although several embodiments have been described in the context of CD players, it should be understood that the RetroBox concept is much broader. For example, without limitation, the channel may be a set-top box, a TV atmospheric channel, or any other suitable communications medium. Furthermore, while an embodiment was presented that included an appliance core on the appliance side, in other embodiments the RetroBox could be used to transport secret information that could only be played by people with the appropriate extension to a standard player. Further, the content could be combined with data hiding such that, in the case of CD audio, the disc would play music under normal circumstances. It should thus be noted that there are many alternative ways of implementing both the processes and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A method of packaging electronic content and control information for use by a system including a retrofitting appliance, the method comprising the steps of:
    encrypting the electronic content and the control information;
    transforming the encrypted electronic content and control information into a format that can be rendered by an electronic appliance;
    storing the transformed, encrypted electronic content and control information on a computer readable medium for provision to an electronic appliance operable to render the transformed, encrypted electronic content and control information and output the encrypted electronic content and control information to an input of the retrofitting appliance, the retrofitting appliance being operable to decrypt the encrypted electronic content and control information, to make a determination based on the control information as to whether to permit use of the electronic content, and to selectively transmit the electronic content to an output device based on the results of the determination.

2. The method of claim 1, further comprising the step of: compressing the electronic content and the control information.

3. The method of claim 1, further comprising the step of: applying error-correction coding to the encrypted electronic content and control information.

4. A non-transitory computer readable medium storing instructions that, when executed by a computer, cause the computer to perform steps comprising:
    packaging electronic content and the control information;
    transforming the packaged electronic content and control information into a format that can be rendered by an electronic appliance; and
    storing the transformed, packaged electronic content and control information on a computer readable medium for provision to an electronic appliance operable to render the transformed, packaged electronic content and control information and output the packaged electronic content and control information to an input of a retrofitting appliance, the retrofitting appliance being operable to unpackage the packaged electronic content and control information, to make a determination based on the control information as to whether to permit use of the electronic content, and to selectively transmit the electronic content to an output device based on the results of the determination.

5. The computer readable medium of claim 4, further comprising instructions that, when executed by a computer, cause the computer to perform steps comprising:
    encrypting the packaged electronic content and control information.

6. The computer readable medium of claim 4, further comprising instructions that, when executed by a computer, cause the computer to perform the step of: compressing the packaged electronic content and control information.

7. The computer readable medium of claim 6, further comprising instructions that, when executed by a computer, cause the computer to perform the step of: applying error correction coding to the compressed, packaged electronic content and control information.

8. An apparatus comprising:
    a storage device including stored instructions; and
    a processor for executing the stored instructions, the stored instructions including instructions that, when executed by the processor, cause the apparatus to perform steps comprising:
        packaging electronic content and the control information,
        transforming the packaged electronic content and control information into a format that can be rendered by an electronic appliance, and
        storing the transformed, packaged electronic content and control information on a computer readable medium for provision to an electronic appliance operable to render the transformed, packaged electronic content and control information and output the packaged electronic content and control information to an input of a retrofitting appliance, the retrofitting appliance being operable to unpackage the packaged electronic content and control information, to make a determination based on the control information as to whether to permit use of the electronic content, and to selectively transmit the electronic content to an output device based on the results of the determination.

9. The apparatus of claim 8, in which the stored instructions further include instructions that, when executed by the processor, cause the apparatus to perform the steps of:
    encrypting the packaged electronic content and the control information.

10. The apparatus of claim 9, in which the stored instructions further include instructions that, when executed by the processor, cause the apparatus to perform the step of: compressing the encrypted, packaged electronic content and control information.

11. The apparatus of claim 10, in which the stored instructions further include instructions that, when executed by the processor, cause the apparatus to perform the step of: applying error correction coding to the compressed, encrypted, packaged electronic content and control information.

12. A method comprising:
providing encoded electronic content and encoded control information to an electronic appliance operable to render the encoded electronic content and encoded control information and output the encoded electronic content and encoded control information to an input of a retrofitting appliance, the retrofitting appliance being operable to decode the encoded electronic content and encoded control information, to determine whether to permit the use of the decoded electronic content based on the decoded control information, and to transmit the decoded electronic content to an output device based on the determination.

13. The method of claim 12, further comprising packaging the encoded electronic content and encoded control information into a data signal.

14. The method of claim 13, further comprising:
encrypting the electronic content and the control information;
encoding the encrypted electronic content and control information in a rendering format supported by the electronic appliance.

15. The method of claim 13, further comprising compressing the electronic content and control information.

16. The method of claim 13, further comprising applying error correction coding to the data signal.

* * * * *